United States Patent
Marquez et al.

[11] Patent Number: 6,042,329
[45] Date of Patent: Mar. 28, 2000

[54] PALLET JACK ATTACHMENT

[76] Inventors: Gregory L. Marquez; Robert J. Provalenko, both of 6021 Manorfield Dr., Huntington Beach, Calif. 92648

[21] Appl. No.: 08/806,323

[22] Filed: Feb. 26, 1997

[51] Int. Cl.[7] ................................................ B66F 11/00
[52] U.S. Cl. ............................................ 414/607; 414/785
[58] Field of Search ..................................... 414/785, 607

[56] References Cited

U.S. PATENT DOCUMENTS

| | | | |
|---|---|---|---|
| 3,791,544 | 2/1974 | Moses | 414/607 |
| 3,825,869 | 7/1974 | Loomis | 414/785 |
| 4,027,771 | 6/1977 | Adams | 414/785 |
| 4,065,014 | 12/1977 | Sagmiller . | |
| 4,325,669 | 4/1982 | Schafer | 414/785 |
| 4,669,949 | 6/1987 | Sutton | 414/607 |

*Primary Examiner*—Thomas J. Brahan
*Attorney, Agent, or Firm*—Morland C. Fischer

[57] ABSTRACT

A pallet jack attachment to be coupled to the forks of a conventional pallet jack so as to be able to engage and drag a standard pallet on which goods are stacked out of a shipping container when the pallet is loaded sideways therewithin. The pallet jack attachment includes a pair of arms projecting rearwardly in spaced, parallel alignment with one another. Locking tabs are welded to the rear ends of the arms and sized to fit within and slide through existing slots formed in the forks of the pallet jack so that the pallet jack attachment is reliably connected to the pallet jack. A channel having a pair of gripping fingers turning upwardly therefrom is located at the front of the pallet jack attachment. When the pallet jack is driven towards the side of a pallet, the channel and gripping fingers of the attachment are correspondingly advanced inwardly thereof via an access opening in the pallet. The forks of the pallet jack are then raised so that the channel and fingers surround and grasp the runner bar of the pallet. As the pallet jack is driven away from the shipping container, the pallet is dragged to a suitable location at which the ends and the sides of the pallet are all readily accessible to the forks of the pallet jack.

6 Claims, 3 Drawing Sheets

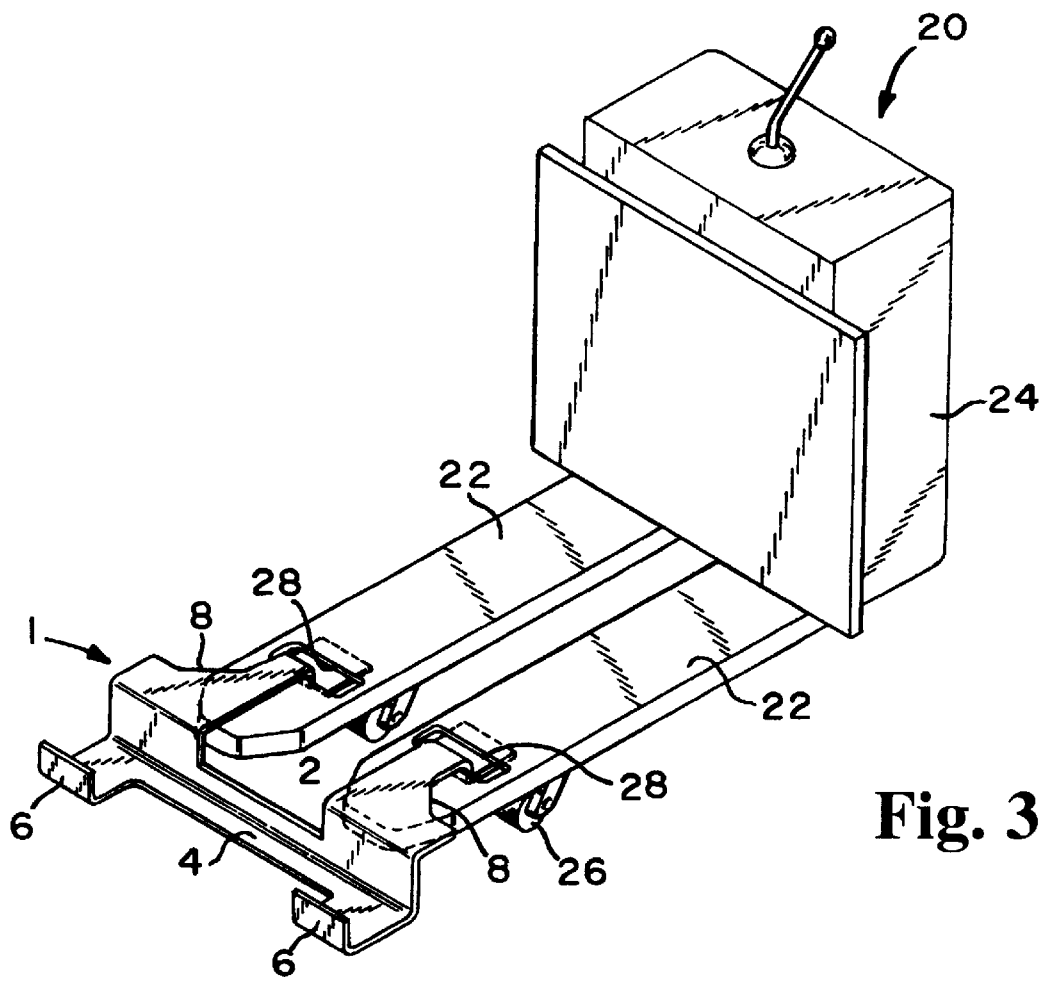
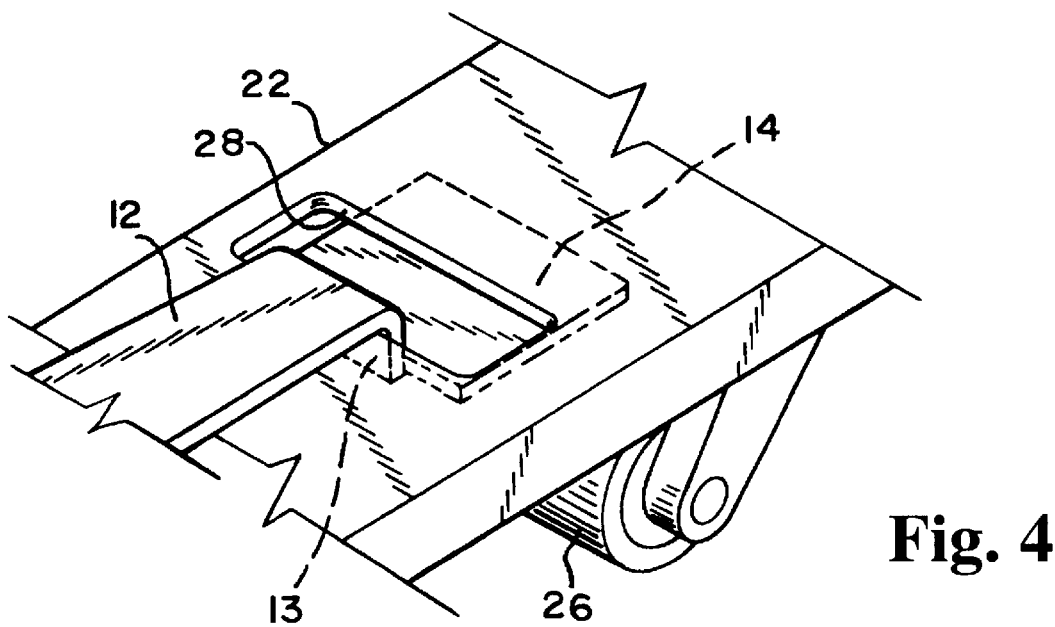
Fig. 3
Fig. 4

PALLET JACK ATTACHMENT

BACKGROUND OF THE INVENTION

1. Field of the Invention

This invention relates to a pallet jack attachment that is adapted to be coupled to the forks of a conventional pallet jack so as to be able to engage and drag a standard pallet out of a shipping container without the aid of a forklift, whereby the pallet is then readily accessible to be lifted and carried by the pallet jack to another location.

2. Background Art

Pallets have long been used as a means of support on which a shipment of goods is carried. The pallets and the goods stacked thereon are typically transported in shipping containers via air, land and sea. The pallets commonly have openings along the front and rear ends thereof that are particularly dimensioned for receiving therethrough a pair of forks of a well known forklift or pallet jack. The forklift or pallet jack is driven towards the front (or rear) of the pallet so that the forks move inwardly through the openings. The forks are then raised so as to correspondingly lift the pallet, whereby to relocate the goods stacked thereon from one place (e.g. a shipping dock) to another at which the goods can be inventoried and designated for their ultimate destination.

It would be desirable to load the pallets within a shipping container (e.g. of the type that is commonly pulled by a truck) so that the pallets are oriented sideways relative to one another. In this case, approximately 22 pallets will fill a standard 48 foot shipping container. However, when they are disposed sideways, the pallets will not be aligned to receive the forks of the pallet jack through the particularly dimensioned openings at the front ends thereof. Inasmuch as the goods stacked on the pallet are usually quite heavy, it may not be an easy task for either a single workman or a few workmen to reposition the pallets to be able to receive the incoming forks of the pallet jack. Consequently, the process of off-loading the shipping container will become both time consuming and cumbersome and may necessitate that the stack of goods be broken down manually so that they can be removed from the container if a forklift is not available.

Of course, it is possible to load the pallets into the shipping container in a lengthwise fashion so that the special openings at the front ends of the pallets are accessible to the incoming forks of the pallet jack. However, in this case, the number of pallets that can be loaded lengthwise into the standard 48 foot shipping container is reduced to about 18. Hence, the efficiency by which the goods are shipped is decreased while overall transportation costs are increased.

Accordingly, it would be desirable to have available an adapter that can be quickly and easily attached to a pallet jack so as to enable pallets that have been efficiently arranged sideways relative to one another to be off-loaded from a shipping container without the aid of and the expense associated with maintaining and operating a forklift.

SUMMARY OF THE INVENTION

In general terms, a pallet jack attachment is disclosed to be removably coupled to a conventional pallet jack so that pallets which are efficiently arranged sideways relative to one another in a shipping container can be off-loaded from the container without using the usual forklift. The pallet jack attachment includes a vertical brace having a horizontal support channel running along the bottom thereof. Coextensively formed with and projecting outwardly from the support channel are a pair of upturned gripping fingers that are located at the front of the pallet jack attachment. Extending rearwardly and horizontally from the top of the brace are a pair of parallel aligned arm extensions. Each arm extension terminates at a short downward bend. Affixed (e.g. welded) to the downward bend of each arm extension is a generally rectangular, horizontally projecting locking tab. The pallet jack attachment is manipulated so that the rectangular locking tabs which depend from respective arm extensions are inserted through the existing slots in the forks of the pallet jack. The locking tabs are then pushed a short distance past the slots so as to slide below the forks of the pallet jack where the locking tabs are positioned to prevent an inadvertent separation of the pallet jack attachment.

With the pallet jack attachment coupled to the pallet jack, the pallet jack is driven towards a pallet to be off-loaded from its shipping container until the upturned gripping fingers at the front of the attachment are moved through the standard access opening at a side of the pallet. The forks of the pallet jack are then raised to cause the support channel and the gripping fingers of the pallet jack attachment to surround and grasp the runner board of the pallet. The pallet jack is driven away from the shipping container, whereby the pallet is correspondingly dragged out of its shipping container. The pallet jack attachment is now withdrawn from the pallet and uncoupled from the pallet jack. With the pallet removed from its shipping container, the pallet jack can be used in much the same way as a forklift to engage the pallet from the openings in the front by which the pallet can be lifted and carried to a desired station for inventory control and relocation to a final destination.

BRIEF DESCRIPTION OF THE DRAWINGS

FIG. 3 shows the pallet jack attachment of FIGS. 1 and 2 coupled to a conventional pallet jack;

FIG. 4 shows an enlarged detail of the pallet jack attachment coupled to a fork of the pallet jack of FIG. 3.

DETAILED DESCRIPTION

Figure 1:
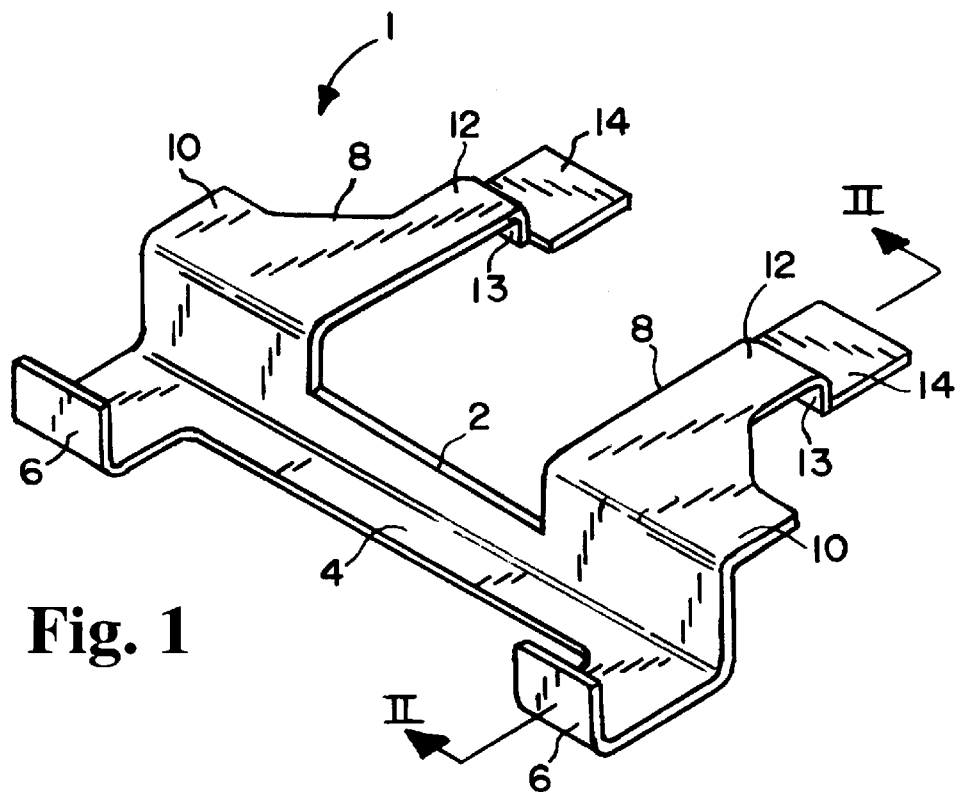
FIG. 1 is a perspective view of the pallet jack attachment which forms the present invention.
Figure 2:
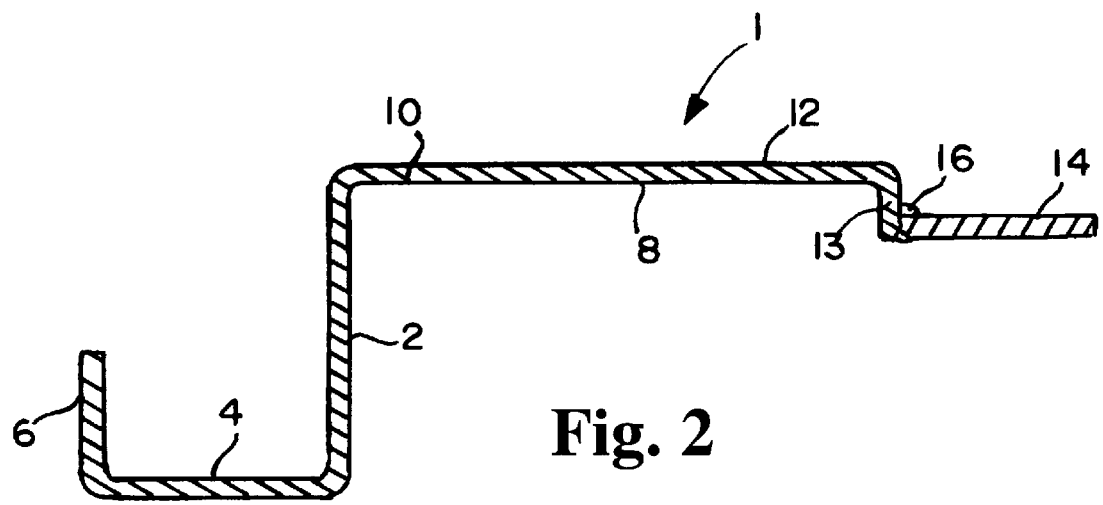
FIG. 2 is a cross-section of the pallet jack attachment taken along lines II—II of FIG. 1.

The pallet jack attachment 1 which forms the present invention and enables a pallet jack to replace a fork lift for removing pallets from a shipping container is initially described while referring to FIGS. 1 and 2 of the drawings. The pallet jack attachment 1 is preferably manufactured from steel and includes a laterally and vertically extending brace 2. Extending forwardly and horizontally from the bottom of the vertical brace 2 is an elongated support channel 4. The support channel 4 runs the entire length of the brace 2. Coextensively formed with and projecting outwardly from opposite sides of the support channel 4 are a pair of upturned gripping fingers 6 that are spaced from one another at the front of the pallet jack attachment 1. Therefore, the brace 2 and upturned gripping fingers 6 are held in parallel alignment at opposite ends of the support channel 4.

Extending rearwardly and horizontally from the top of the brace 4 are a pair of arm extensions 8. The direction in which the arm extensions 8 project from the top of the vertical brace 2 is opposite the direction in which the support channel 4 projects from the bottom of the brace 2. Moreover, the horizontal arm extensions 8 are disposed approximately four inches above the support channel 4. The arm extensions 8 coextend from opposite sides of the brace 2 so as to be aligned in spaced, parallel alignment with one another and project rearwardly from brace 2 for a distance of approximately two feet.

Each arm extension 8 includes a relatively wide shoulder 10 that is integral with the top of the brace 2. The shoulder 10 of each arm extension 8 tapers into a relatively narrow finger 12 that terminates at a short downward bend 13. Affixed to the downward bend 13 of each narrow finger 12 is a generally rectangular horizontally disposed locking tab 14. The locking tabs 14 are affixed to the bends 13 of respective arm extensions 8 by means of a conventional weld 16, or the like, best shown in FIG. 2. Therefore, the locking tabs 14 will be spaced slightly below the arm extensions 8 to which they are welded.

FIGS. 3 and 4 of the drawings show the pallet jack attachment 1 of this invention coupled to a pallet jack 20 to enable the pallet jack to perform the function of a forklift. It is to be understood that the pallet jack 20 is of conventional design and forms no part of this invention. Hence, the pallet jack 20 will not be described in detail. Briefly, however, pallet jack 20 includes a pair of parallel aligned forks 22 that project from a control stand 24 and are adapted to be raised and lowered relative thereto under either electrical or manual power. Each fork 22 is supported by one or more wheels or rollers 26. A rectangular slot 28 is formed through each of the forks 22 of pallet jack 20 to permit access to a wheel 26 therebelow.

In order to detachably couple the pallet jack attachment 1 of FIGS. 1 and 2 to the pallet jack 20 of FIGS. 3 and 4, the pallet jack attachment is manually carried to the pallet jack 20. After the forks 22 of pallet jack 20 are raised approximately six inches above the wheels 26, the pallet jack 20 is manipulated so that the rectangular locking tabs 14 which depend from the finger bends 13 of arm extensions 8 are inserted through the existing slots 28 in the forks 22. It should be understood that the locking tabs 14 must be sized so as to be accommodated by the slots 28 in the forks 22 of pallet jack 20. It may also be appreciated that because the locking tabs 14 are disposed slightly below the arm extensions 8 from which they depend (by means of the bends 13 of fingers 12), the locking tabs 14 can drop into and slide a short distance past the slots 28 in forks 22, whereby the locking tabs 14 are received below the forks 22 to prevent the inadvertent separation of the pallet jack attachment 1 from the pallet jack 20.

Figure 5:
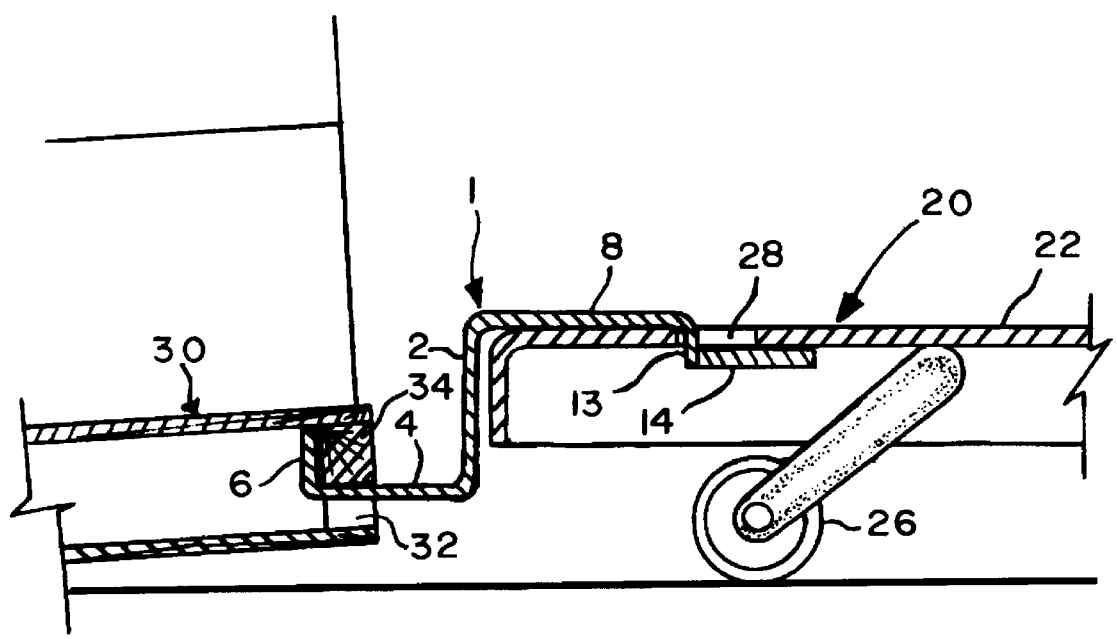
FIG. 5 is a cross-section showing the pallet jack to which the pallet jack attachment is coupled dragging a pallet out of its shipping container.

Turning to FIG. 5 of the drawings, with the pallet jack attachment 1 interconnected to the pallet jack 20 in the manner described above, the pallet jack 20 is driven towards the side of a well known pallet 30 on which a supply of goods is stacked. By way of example, the pallet 30 may be one of many similar pallets that are loaded and shipped sideways in a truck container that has been stationed at an unloading dock to permit the pallets to be off-loaded one-by-one so that the goods carried on the pallets can ultimately be transported to their final destinations.

The pallet jack 20 continues to move towards the pallet 30 until the support channel 4 and the upturned gripping fingers 6 at the front of the pallet jack attachment 1 are moved through the standard side access opening 32 of the pallet 30 and inwardly of the runner board 34 thereof. The forks 22 of the pallet jack 20 are then raised an additional distance. As the forks 22 are raised, the pallet jack attachment 1 is simultaneously raised an identical distance. Accordingly, the runner board 34 is received within the support channel 4 of the pallet jack attachment 1, and the upturned gripping fingers 6 function as a hook to surround and grasp the runner board 34. The pallet jack 20 is now driven away from the shipping container. Inasmuch as the pallet 30 is mated to the pallet jack attachment 1 at the support channel 4 and upturned gripping fingers 6 thereof, the pallet 30 is correspondingly dragged out of the container.

Once the pallet 30 is pulled a suitable distance from the shipping container, the forks 22 of the pallet jack 30 are lowered slightly so that the upturned gripping fingers 6 of attachment 1 are unhooked from the runner board 34. The support channel 4 and upturned gripping fingers 6 of pallet jack attachment 1 are withdrawn from the side access opening 32 in the pallet 30 to enable the same or a different pallet jack to be used to engage and carry the pallet 30 in the usual fashion to another location. That is, with the forks 22 of the pallet jack 20 still raised off the ground, the pallet jack attachment 1 is quickly and easily detached from the forks 22 by simply sliding and pulling the locking tabs 14 out of the slots 28 in the forks. However, in this case, with all sides of the pallet 30 now available to the pallet jack 20, the forks 22 can be driven towards and inserted into the standard openings at the front of the pallet 30 so that the pallet can be lifted off the ground by the pallet jack 30 and carried to a desired station at which to await inventory control and relocation. The pallet jack attachment 1 may once again be removably coupled to the pallet jack 20 so that another pallet 30 can be dragged at its side form its shipping container to be made readily accessible to the forks 22 of the pallet jack 20.

By virtue of the present invention, an attachment is now available that easily converts a pallet jack into a forklift, whereby a pallet jack can be used as would a forklift in off-loading pallets from a shipping container. However, the relatively high cost normally associated with maintaining and operating an on-site forklift can be avoided. Moreover, the pallets may be oriented sideways so that a larger number of pallets can be shipped per container to thereby increase shipping efficiency while, at the same time, reduce shipping costs.

It will be apparent that while a preferred embodiment of the invention has been shown and described, various modifications and changes may be made without departing from the true spirit and scope of this invention. Having set forth the preferred embodiment.

What is claimed is:

1. In combination:
   a pallet jack to carry a pallet having a runner board and an access opening communicating with the runner board, said pallet jack including a control stand, a pair of elongated forks projecting from the control stand, and an opening in each of said elongated forks; and
   an adapter to be detachably coupled to the pallet jack, said adapter including a pair of outstretched arms located at a first end thereof, a locking tab affixed to each of said pair of arms and sized to be received through a respective opening in each of said pairs of elongated forks of said pallet jack to attach said adapter to said pallet jack, hook means projecting from the opposite end of said adapter, and a channel running laterally between said pair of outstretched arms and said hook means, said hook means turning upwardly from said channel;
   said adapter adapted to be moved inwardly of the access opening in the pallet so that said channel receives the runner board of the pallet therewithin, whereby and said hook means grips the runner board for causing the pallet to be dragged from one location to another when the pallet jack to which said adapter is detachably coupled is first driven towards and then away from the pallet.

2. The combination recited in claim 1, wherein the hook means of said adapter comprises a pair of spaced, parallel aligned gripping fingers turning upwardly and perpendicularly from said channel for gripping and pulling on the runner board of the pallet when the runner board is received within said channel.

3. The combination recited in claim 2, wherein said pair of gripping fingers are connected to and turn upwardly from opposite ends of said channel.

4. The combination recited in claim 1, wherein said pair of outstretched arms of said adapter are arranged in spaced, parallel alignment with one another.

5. The combination recited in claim 1, wherein said locking tab of said adapter is affixed to a respective outstretched arm of said pair of arms at a downwardly turned bend thereof so that each locking tab is disposed below each of said outstretched arms.

6. The combination recited in claim 5, wherein each locking tab of said adapter is welded to a respective outstretched arm of said pair of arms at the downwardly turned bend of each arm.

* * * * *